Oct. 30, 1956 W. A. COLBURN 2,768,746
MAGNETIC FILTER
Filed Feb. 26, 1954 3 Sheets-Sheet 1
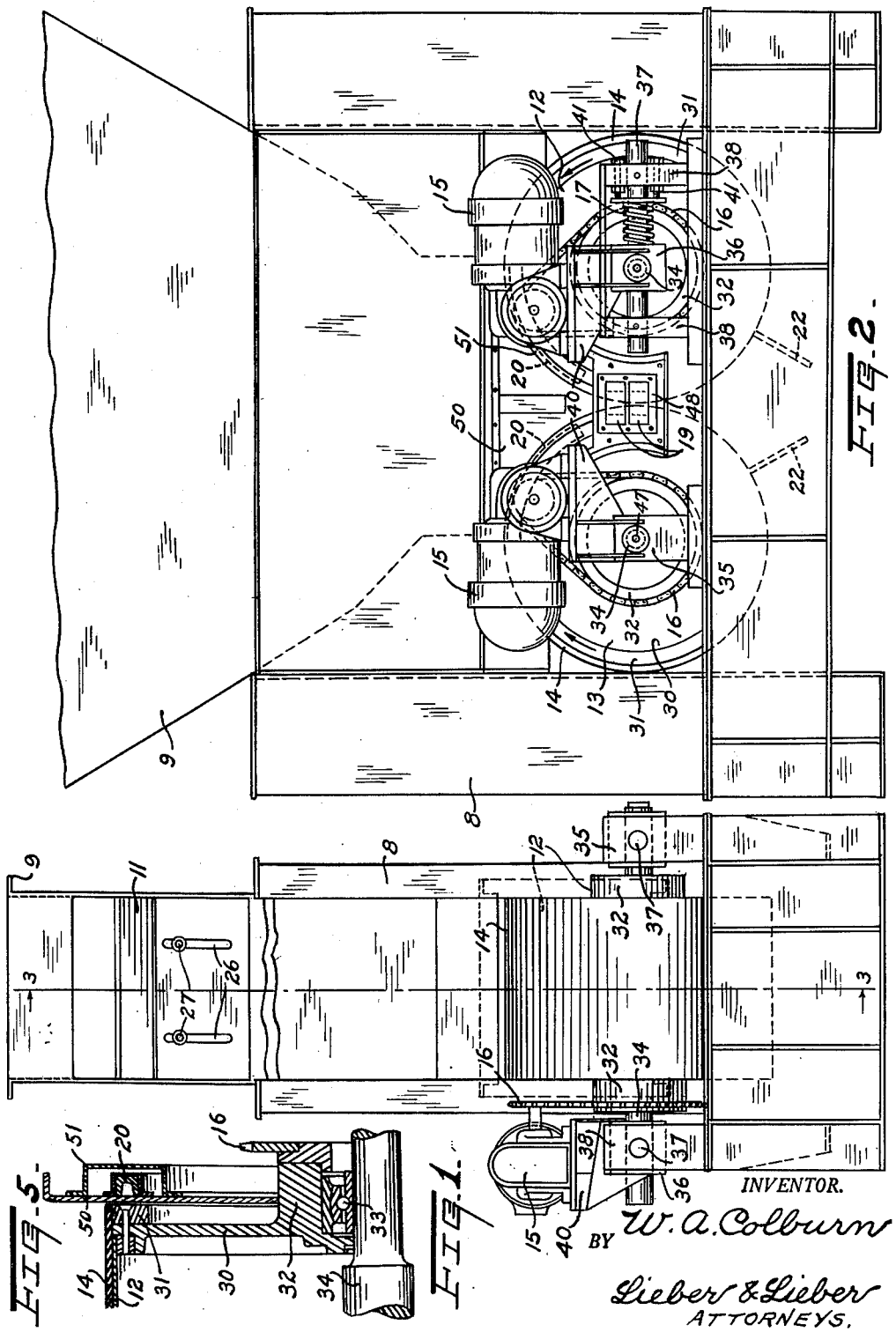
INVENTOR.
W. A. Colburn
BY
Lieber & Lieber
ATTORNEYS.

Oct. 30, 1956 W. A. COLBURN 2,768,746
MAGNETIC FILTER
Filed Feb. 26, 1954 3 Sheets-Sheet 2

INVENTOR.
W. A. Colburn
BY
Lieber & Lieber
ATTORNEYS.

United States Patent Office 2,768,746
Patented Oct. 30, 1956

2,768,746
MAGNETIC FILTER

William A. Colburn, Golden, Colo., assignor to Dings Magnetic Separator Co., Milwaukee, Wis., a corporation of Wisconsin Application February 26, 1954, Serial No. 412,725

8 Claims. (Cl. 210—1.5)

The present invention relates in general to improvements in the art of dewatering finely divided magnetic ore suspended in liquid, and relates more specifically to an improved method of an apparatus for magnetically filtering or separating magnetite ore from excess water.

The primary object of my invention is to provide an improved method of treating a mixture of fine magnetite ore particles mixed with water in order to remove the ore from excess liquid with the aid of magnetic influence, and to also provide improved apparatus for effectively carrying on the steps of the new method.

When magnetite ore which has been pulverized to minus 300 mesh or finer, is treated in wet separators, the resultant concentrates usually comprise slurry containing approximately 50% solids and 50% water. This type of ore has the characteristic of causing the magnetic particles to agglomerate or flocculate when subjected to even slight magnetic influence, thus making it difficult to filter the ore from a mixture or slurry wherein the fine particles are suspended in excess liquid. The flocculated particles quickly clog ordinary filtering media and necessitate frequent attention, and the prior filtering methods also required large and bulky installations in order to provide sufficient capacities for commercial purposes.

I have discovered that this agglomerating or flocculating characteristic of such magnetite ore can be effectively utilized to aid in the filtration or separation of these mixtures, rather than to hinder the same, and that vastly improved dewatering of slurry comprising fine magnetite ore and water, can be continuously and automatically effected with the use of rapidly functioning and relatively simple equipment of great capacity in a most dependable manner.

It is therefore a more specific important object of the present invention to provide an improved process of filtering or separating magnetite ore particles from a suspension liquid by utilizing the magnetic characteristic of the ore to most effectively remove the particles in relatively dry condition from the excess water.

Another important object of the invention is to provide simple, compact and highly efficient apparatus for effecting commercial exploitation of the improved dewatering process, with minimum cost and attention.

Still another object of this invention is to provide an improved method of and apparatus for filtering or dewatering magnetite ore slurry by permitting the ore particles to gravitate through an extensive basin of the liquid into a zone of magnetic influence in which they are caused to flocculate and are compressed to express excess liquid, the dewatered solids being constantly discharged from the compression zone by gravity and the removed liquid also being constantly delivered from the basin as relatively pure water.

These and other objects and advantages of the invention will be apparent from the following detailed description.

A clear conception of the steps involved in the improved dewatering method, and of the construction and operation of a magnetic filtering unit adapted to commercially exploit the new method, may be had by referring to the drawings accompanying and forming a part of this specification wherein like reference characters designate the same or similar parts in the various views.

Fig. 1 is a somewhat fragmentary end view of one of the improved filtering units especially adapted to carry on my improved magnetite ore dewatering method;

Fig. 2 is a likewise fragmentary side elevation of the filtering unit shown in Fig. 1, looking toward the press or wringer roll driving mechanism of the assemblage;

Fig. 5 is a likewise enlarged fragmentary substantially radial section through one of the press roll ends showing one of the permanent arcuate magnets which provide magnetic seals along the opposite sides of the settling basin.

Figures 3, 4:
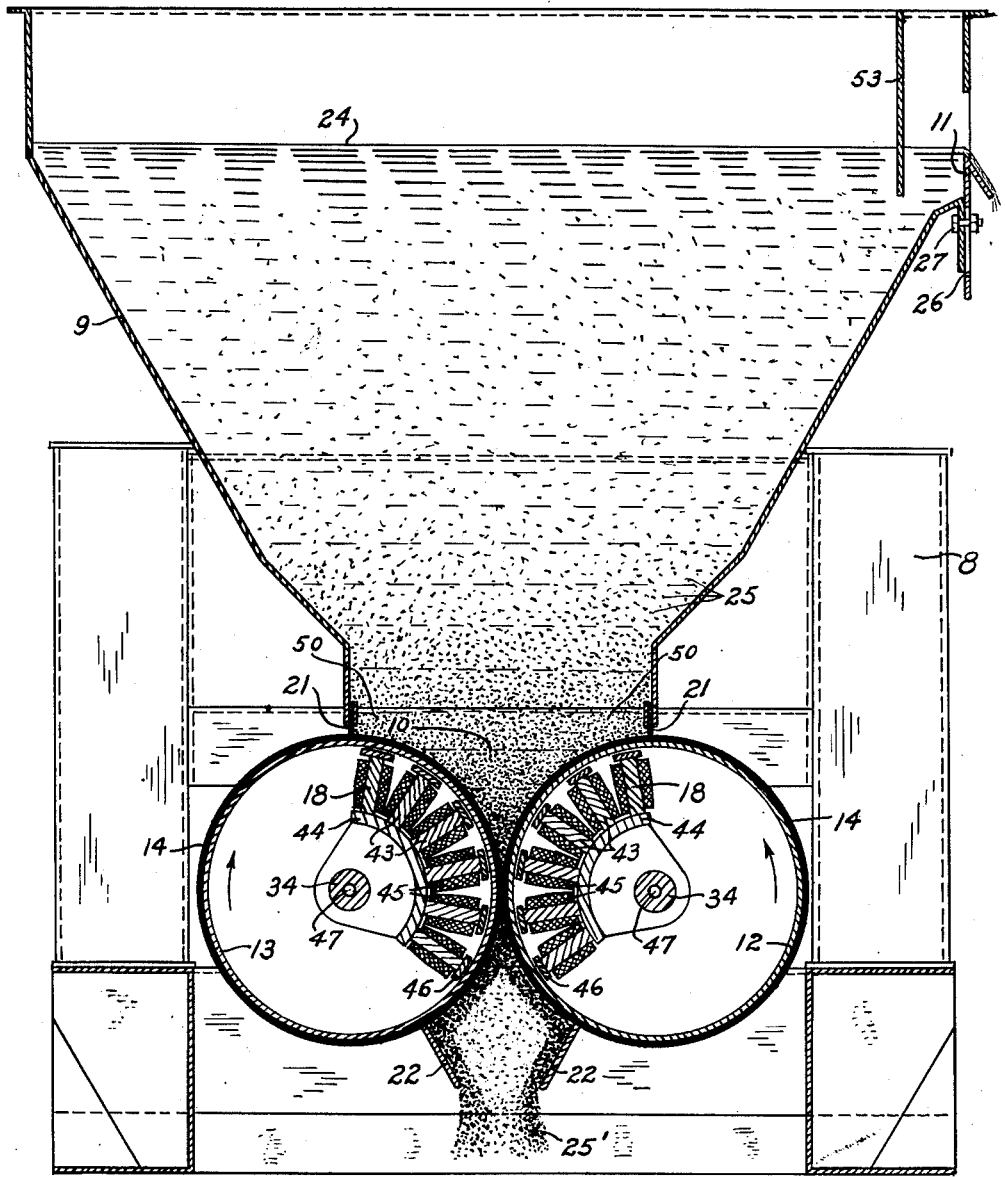
Fig. 3 is a vertical section through the same filtering unit, taken along the line 3—3 of Fig. 1, and showing the filter in actual operation.
Fig. 4 is an enlarged fragmentary horizontal section taken through an end of the wringer rolls between a pair of permanent horse-shoe magnets which provide a magnetic seal at the zone of maximum pressing action.

While the invention has been shown and described herein as being especially useful for the purpose of dewatering magnetite ore slurry discharged as concentrate from magnetic wet separators or the like, it is not my desire or intent to unnecessarily restrict its use to such purposes; and it is also contemplated that specific descriptive terms employed herein be given the broadest possible interpretation consistent with the disclosure.

Referring to Figs. 1 to 5 of the drawings, the improved magnetic filter shown therein and which is especially adapted to dewater magnetite ore slurry, comprises in general, a sturdy main frame 8 providing a support for a slurry confining hopper 9 of relatively great height and large capacity having a lower central outlet 10 and an upper liquid overflow weir 11; a pair of hollow wringer or press rolls 12, 13 journalled for rotation about horizontal axes and in the directions indicated upon the frame 8 beneath the hopper outlet 10, and having coacting resilient peripheral coatings or coverings 14; an electric motor and speed reduction unit 15 drivingly connected to each of the rolls 12, 13 by means of a chain drive 16; compression springs 17 for constantly resiliently urging the rolls 12, 13 toward each other; a group of electro-magnets 18 fixedly confined within each of the hollow rolls 12, 13 for creating a field of relatively strong magnetic flux within the lower-most portion of the hopper 9 and beneath its outlet 10; horse-shoe shaped permanent magnets 19 fixedly mounted with respect to frame 8 at each end of and near the line of closest approach of the resilient roll coverings 14 toward each other; an arcuate permanent magnet 20 also fixedly mounted with respect to the frame 8 at each end of each roll 12, 13 near the hopper outlet 10; a resilient sealing strip 21 suspended from the hopper 9 and engaging the uppermost peripheral portion of each of the rolls 12, 13 on the opposite sides of the hopper outlet 10; and a scraper blade 22 carried by the frame 8 and likewise coacting with the periphery of each roll 12, 13 below and beyond the range of magnetic influence of the electro-magnets 18.

The main frame 8 and the hopper 9 may be formed of sheet metal or the like, and the upwardly open hopper 9 should be of relatively great height in order to permit a slurry basin 24 of considerable depth to be maintained therein. This hopper 9 should also be of rather large capacity so as to constantly insure an ample supply of the mixture of magnetite 25 and water which may be continuously admitted to the open upper end of the hopper from a wet type of magnetic separator or the like, and also in order to provide a basin 24 having considerable settling area. The clean water overflow weir 11 may also be made vertically adjustable by means of slots 26 and bolts 27 as shown in Figs. 1 and 3 so as to permit variation of the liquid head within the basin 24, and the lower outlet opening 10 of the hopper 9 should be directed downwardly between the rolls 12, 13 and between the resilient sealing strips 21 which should be adjusted to snugly engage the adjacent peripheral roll coverings 14.

The hollow wringer or press rolls 12, 13 may be of like formation each being constructed of a cylindrical shell of non-magnetic metal to which the flexible coating or covering 14 preferably formed of rubber or the like may be firmly vulcanized or otherwise secured, and each shell has opposite end heads 30 also preferably formed of non-magnetic metal attached therein. Each of the end heads 30 is provided with an outer ring 31 of magnetic metal within the adjacent end of the adjoining roll covering 14 as shown in Figs. 4 and 5, and also has an integral hub 32 within which an antifriction or ball bearing 33 is confined. One of the end head hubs 32 of each press roll 12, 13 has a sprocket of one of the chain drives 16 secured thereto, and the end bearings 33 of each of the rolls 12, 13 are mounted upon a fixed or non-rotary central horizontal shaft 34 about which the corresponding roll is freely revolvable. The non-rotary suspension shaft 34 of the roll 13 may be mounted in fixed end supports 35 secured to the main frame 8, but the non-rotary suspension shaft 34 of the other roll 12 should be mounted in end supports 36 which are adjustable and movable along parallel rods 37 supported in brackets 38 also secured to the main frame 8.

The electric motor and speed reduction units 15 which normally rotate the rolls 12, 13 in opposite directions through the chain drives 16 or any other suitable transmissions, are relatively well known construction, but these units are preferably mounted upon shelves 40 carried directly by one of the adjacent end supports 35, 36 for the corresponding roll suspension shafts 34 in order to insure proper driving of the rolls 12, 13 through the endless chain transmissions at all times, see Fig. 2. The driving unit 15 of the adjustable and laterally movable roll 12 is therefore adapted to be displaced along the parallel rods 37 with the roll 12; and the compression springs 17 which surround the rods 37 and coact with the adjacent supports 36 and brackets 38, constantly resiliently urge the movable roll 12 toward the other roll 13 so as to produce considerable pressure between the coacting rubber coverings 14 of these rolls along a horizontal intervening line while permitting the rolls to accommodate layers of solid particles of varying thickness therebetween. The extent of this pressure and of the compression of the helical springs 17, may be varied by adjusting a pair of screws 41 which are screw threaded in the adjacent brackets 38 and coact with reaction plates engaging the adjacent compression springs 17, and the same type of mounting may obviously be applied to both rolls 12, 13 if so desired.

The two groups of magnets 18 for creating a field of relatively strong magnetic flux or influence within the lower portion of the hopper 9 and beneath the hopper outlet 10, may also be of like formation and are preferably of the electro-magnetic type. As shown in Fig. 3, each of these groups of magnets consists of a series of radial magnetic cores 43 carried by a supporting member 44 mounted upon one of the fixed shafts 34, and each core 43 is embraced by an energizing coil 45 and may be provided with a pole shoe 46 at its outer end located in close proximity to the adjacent non-magnetic roll shell. The coils 45 of these magnets 18 may be energized through conductors passing through central holes 47 in the adjacent supporting shafts 34, and the energization of these coils 45 is preferably such that the successive cores 43 and poles have opposite polarity and alternate cores and shoes have the same polarity. The corresponding or opposed cores 43 and poles of the two groups of magnets 18 which are confined within the rolls 12, 13 respectively, should however be of the same polarity, and permanent magnets may obviously be utilized. The primary purpose of the magnets 18 is to initially agglomerate or flocculate the magnetic particles 25 in the slurry as they descend toward the hopper outlet 10 and approach the rolls 12, 13, and to thereafter hold the magnetite against the roll coverings 14 with sufficient force so that the accumulated layers will be carried downwardly between these wringer rolls 12, 13.

Since the lower portion of the slurry basin 24 is constantly exposed to the peripheries of the normally rotating wringer rolls 12, 13 through the open outlet 10, it is essential to positively prevent escape of liquid at the opposite ends and around the peripheries of these rolls. The resilient sealing strips 21 which are suspended from the frame 8 and from the bottom of the hopper 9 by upright walls, may be vertically adjusted to engage the rubber roll coverings 14 so as to effectively prevent escape of liquid along the roll peripheries, and these strips 21 may be formed of rubber or any other flexible material. Howeve, in order to eliminate escape of liquid at the opposite ends of the rolls 12, 13 magnetic seals are provided both at the line of closest approach of the roll peripheries and at the ends of the wringer rolls from the sealing strips 21 approximately up to the seals which are located near this line of closest approach, and both of these sets of magnetic seals comprise magnets cooperating with the magnetic rings 31 carried by the end heads 30 of the rolls 12, 13.

As shown in Figs. 2 and 4, each of the magnetic seals coacting with the rotating rolls 12, 13 at the opposite ends of their line of closest approach or squeeze zone, consists of a pair of horseshoe magnets 19 each having opposed poles engaging a mounting plate 48 secured to a side wall 50 of the main frame 8 by bolts 49; and the poles of each of these two magnets cooperate with the adjacent revolving magnetic rings 31 of both rolls 12, 13 through the supporting walls 50 to cause magnetic particles 25 to occupy the spaces between the rings 31 and the adjacent frame walls 50 and to thus effectively seal the slight gaps at the opposite ends of the squeezing zone. As shown in Figs. 2 and 5, each of the magnetic seals coacting with the opposite side rings 31 of the rotating rolls 12, 13, consists of an arcuate magnet 20 having curved opposed poles also engaging the non-magnetic wall 50 of the flocculating zone on each of its opposite sides; and these arcuate magnets also coact with the revolving magnetic rings 31 of both rolls 12, 13 to cause magnetic particles 25 to occupy the spaces between the rings 31 and the adjacent walls 50 and to thereby effectively seal the gaps at the opposite ends of the rolls between the sealing strips 21 and the magnets 19. The magnets 19, 20 may be permanent "Alnico" magnets or of any other suitable type, and the arcuate magnets 20 may also be housed within casings 51 secured to the plates 50 as shown.

The scraper blades 22 which are secured to the main frame side walls beyond and beneath the squeeze zone, preferably contact the resilient roll coverings 14 so as to remove alhering cakes of relatively dry filtered or dewatered particles 25' from the rotating rolls, and these blades 22 convege to form a chute for directing the final product away from the magnetic filter unit. The bottom of the main frame beneath the rolls 12, 13 may be left open and free from obstruction, and the portions of the roll peripheries beyond these scraper blades and up to the sealing strips 21 may also be left open for inspection at all times.

When the improved magnetic filter unit has been properly constructed, assembled and installed as above described, its normal operation is substantially as follows. An abundant quantity of magnetite slurry should be constantly admitted to the hopper 9 through its open top to form the relatively deep and wide basin 24, and as an example, this slurry may consist of an approximately fifty percent mixture of water and magnetite particles 25 reduced to at least 300 mesh or finer. The rolls 12, 13 may be constantly rotated at suitable speeds in opposite directions as indicated by the arrow in Figs. 2 and 3; and if electro-magnets 18 are utilized, they should be energized to create a relatively strong magnetic field throughout at least the lower portion of the basin 24 near the outlet 10. If electro-magnets are used instead of the permanent magnets 19, 20, these should also be energized, and the sealing strips 21 and scraper blades should be set to properly engage the peripheral coverings 14 of the rotating rolls.

With the unit adjusted and operating in this manner, the solid particles 25 will gradually descend by gravity through the quiescent basin 24 and as they enter the zone of magnetic flux or influence near the lower portion of this basin the descending particles 25 will be quickly magnetized sufficiently to cause them to agglomerate or flocculate into masses and to more quickly descend between the adjacent roll peripheries which are exposed to the basin 24. The advancing and approaching roll coverings 14 thereafter quickly wring or press the magnetite masses with sufficient pressure to express most of the liquid therefrom and to form cakes which may contain approximately ten percent or less of residual moisture, and these caked particles 25' are subsequently delivered by gravity between the scraper blades 22 or removed from the roll peripheries by these blades, while the expressed liquid rises through the basin 24 and is discharged as relatively clean water over the weir 11.

The functioning of the unit continues automatically and continuously as long as the basin 24 is supplied with fresh slurry, and while the filtering action continues the sealing strips 21 and the sealing magnets 19, 20 also function to positively prevent undesirable escape of liquid past the rolls 12, 13. When it becomes desirable to empty the hopper 9, the rolls 12, 13 may be readily separated by manipulating the screw stops 41 so as to provide a relatively wide gap between the wringer rolls, and these stops 41 may also be utilized to regulate the extent of the dewatering action. The position of the weir 11 may also be readily adjusted to vary the head of liquid within the basin 24 and a baffle 53 such as shown in Fig. 3 in advance of the weir may also be provided in order to prevent escape of magnetic particles with the discharged water. The wringing pressure may also be conveniently varied by adjusting the screw stops 41, and these adjustments can be made while the unit continues to operate.

Figure 6:
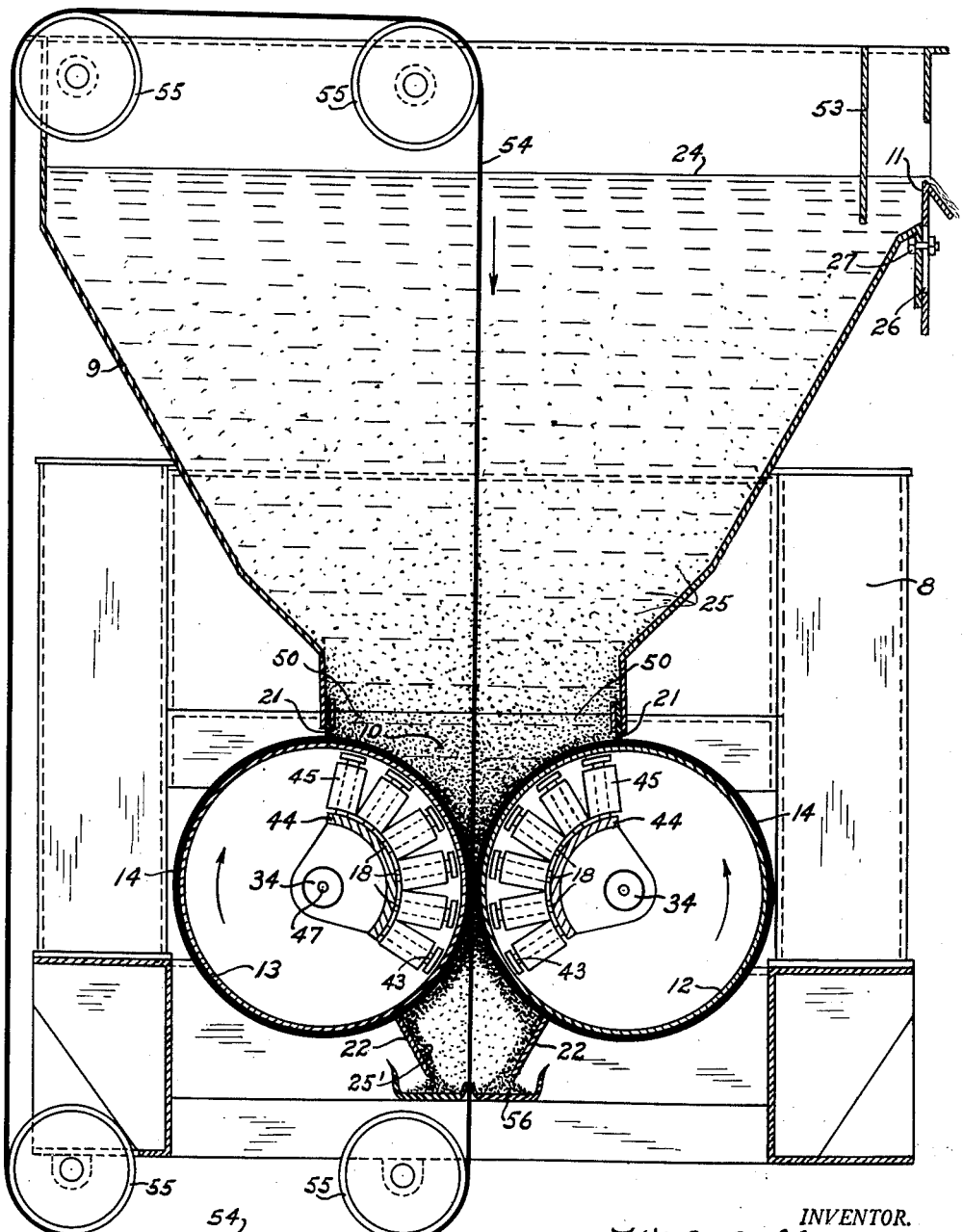
Fig. 6 is another somewhat diagrammatic vertical section, showing a modified filtering or dewatering unit embodying the invention.

In the modified dewatering unit shown in Fig. 6, most of the parts are constructed and function substantially the same as hereinabove described with respect to Figs. 1 to 5 inclusive, but additional means are provided for causing the flocculated magnetic particles 25 to advance more rapidly toward the wringing zone, in the form of an endless fabric belt 54 and belt supporting pulleys 55. This belt may either be positively driven or frictionally advanced by contact with the roll peripheries, and has an upright run or stretch which travels downwardly through the basin 24 and between the rolls at the squeezing zone. Many of the flocculated magnetite particles near the hopper outlet 10 and within the field of magnetic influence, tend to stick to the opposite faces of the downwardly traveling stretch and are thus carried into the zone of action of the rolls 12, 13, and the relatively dry cake 25' is removed from the roll peripheries by the scrapers 22 and drops into a laterally extending and inclined chute 56 beneath these scrapers.

From the foregoing detailed description it will be apparent that the present invention provides an effective method of filtering or dewatering magnetic slurry, which may be effectively carried on with simple and automatically functioning apparatus. The successive steps of the improved method are performed with utmost precision to produce uniform and substantially dry final product, without danger of interruption or clogging as with ordinary filtering media. The improved magnetic seals also cooperate with the wringer rolls 12, 13 to positively eliminate undesirable escape of liquid from the basin 24 at the opposite ends of these rolls, and the filtering units have great capacity considering the size and simplicity thereof. The opposite polarity of the electromagnets 18 also serves to agitate the mass of magnetic particles 25 while advancing toward the outlet 10, and when the flocculating particles 25 pass through the outlet opening and toward the roll peripheries they form a relative thick mass from which a considerable portion of the liquid has been freed. The use of the fabric belt 54 may also augment the dewatering or filtering action of the unit, although it has been found that such expedient is not essential. While the method and apparatus are especially adapted to treat magnetite ore slurry, they may also be utilized for the filtration of other mixtures of liquid and fine magnetic particles which are capable of flocculating when subjected to magnetic flux, but the improvement has proven especially successful in actual use for the purpose of dewatering magnetic ore mixtures.

It should be understood that it is not desired to limit this invention to the exact steps of the method or to the precise construction of the apparatus, herein shown and described, for various modifications within the scope of the appended claims may occur to persons skilled in the art.

I claim:

1. In a magnetic filter, a hopper for maintaining an abundant supply of mixed magnetic particles and water under considerable hydrostatic head and having a lower outlet and an upper water discharge weir for all of the separated liquid, a pair of oppositely rotatable wringer rolls for dewatering flocculated magnetic particles settling from the mixture in said hopper through said outlet and between the roll peripheries and for expressing residual liquid from said particles into said hopper, and magnetic seals for the ends of said rolls adjacent to said hopper outlet.

2. In a filter for magnetite ore slurry, a hopper for maintaining an extensive and relatively deep basin of the slurry and having a lower outlet, a pair of peripherally coacting wringer rolls having flexible peripheries constantly exposed to said basin through said outlet and coacting directly with each other to dewater magnetite ore particles settling through the basin outlet and to return the separated liquid to said basin, a magnet confined within each of said rolls for magnetizing and flocculating said particles while approaching said roll peripheries, and other magnets coacting with the opposite ends of said rolls to prevent escape of liquid from said basin past the rolls.

3. In a filter for magnetite ore slurry, means for maintaining a relatively deep slurry basin having a lower magnetite ore particle outlet and a clear liquid overflow for all of the separated liquid, a pair of wringer rolls having approaching peripheries beneath said outlet constantly exposed to said basin through the outlet and coacting to positively prevent escape of liquid from said basin past the roll peripheries, a magnet associated with each of said rolls for flocculating said particles as they settle from said basin through said outlet toward said exposed roll peripheries, and other magnets associated with the opposite ends of said rolls to prevent escape of liquid from said basin past said roll ends.

4. In a filter for magnetite ore slurry, means for maintaining a relatively deep slurry basin having a lower magnetite ore particle outlet and a clear liquid overflow for all of the separated liquid, a pair of wringer rolls having approaching peripheries beneath said outlet constantly exposed to said basin through the outlet and coacting to positively prevent escape of liquid from said basin through said outlet, a magnet associated with each of said rolls for flocculating said particles as they settle from said basin through said outlet toward said exposed roll peripheries, and other magnets associated with the opposite ends of said rolls to prevent escape of liquid from said basin past said roll ends, a sealing strip coacting with the periphery of each of said rolls on opposite sides of said basin outlet, and magnetic seals coacting with the opposite ends of said rolls between said sealing strips and the line of closest approach of said roll peripheries toward each other.

5. The method of separating finely divided magnetic ore particles from slurry, which comprises, maintaining a quiescent basin of the slurry of sufficient depth and of downwardly diminishing transverse area to cause the fine magnetite particles to settle in concentrated condition toward the constricted basin bottom, subjecting the concentrated and settled particles to magnetic influence of sufficient strength to flocculate the same, compressing the flocculated particles to express entrained moisture therefrom and to deliver the magnetite particles in dry condition from the constricted lower basin portion, while causing the expressed moisture to remain within the basin, magnetically sealing the lower basin portion against escape of free liquid, and removing all of the excess and separated liquid at an upper portion of the basin.

6. In a magnetic filter for magnetite ore slurry, a hopper for maintaining an abundant basin of the slurry under considerable hydrostatic head and having a lower outlet for solid material and an upper overflow for all separated and excess liquid, means for maintaining a field of magnetic influence within said basin near said outlet to flocculate magnetic particles within the lower portion of the basin, means for extracting and dewatering the flocculated particles and for delivering only dehydrated particles from said basin outlet, and magnetic sealing means for preventing escape of liquid past said dewatering means.

7. In a magnetic filter for magnetite ore slurry, a hopper for maintaining an abundant basin of the slurry under considerable hydrostatic head and having a lower outlet for solid material and an upper overflow for all separated and excess liquid, means for maintaining a field of magnetic influence within said basin near said outlet to flocculate magnetic particles within the lower portion of the basin, cooperating wringer rolls for extracting and dewatering the flocculated particles and for delivering only dehydrated particles from said basin outlet, and magnetic seals for the ends of said rolls near said outlet.

8. In a magnetic filter for magnetite ore slurry, a hopper for maintaining an abundant basin of the slurry under considerable hydrostatic head and having a lower outlet for solid material and an upper overflow for all separated and excess liquid, means for maintaining a field of magnetic influence within said basin near said outlet to flocculate magnetic particles within the lower portion of the basin, a pair of oppositely rotatable wringer rolls having internal magnets for flocculating magnetic particles within the lower portion of said basin and also having cooperating peripheries for extracting and dewatering the flocculated particles and for delivering only dehydrated particles from said basin outlet, and other magnets coacting with the ends of said rolls to prevent escape of liquid past said roll ends.

References Cited in the file of this patent
UNITED STATES PATENTS

| | | |
|---|---|---|
| 35,896 | Rust | July 15, 1862 |
| 468,540 | Cane | Feb. 9, 1892 |
| 946,394 | Ohrn | Jan. 11, 1910 |
| 1,546,330 | Ullrich | July 14, 1925 |
| 2,088,364 | Ellis et al. | July 27, 1937 |
| 2,154,010 | Queneau | Apr. 11, 1939 |
| 2,308,031 | Schmitz | Jan. 12, 1943 |
| 2,499,412 | Peterson | Mar. 7, 1950 |
| 2,711,686 | Denison et al. | June 28, 1955 |